United States Patent [19]

Cosack et al.

[11] 4,302,333
[45] Nov. 24, 1981

[54] BACKPRESSURE GRID PLATE FOR PRESSURE FILTRATION SYSTEM

[75] Inventors: Klaus Cosack; Wolfgang Hein; Manfred Neumann, all of Dassel, Fed. Rep. of Germany

[73] Assignee: Carl Schleicher & Schull GmbH & Co. KG, Einbeck, Fed. Rep. of Germany

[21] Appl. No.: 904,885

[22] Filed: May 11, 1978

[30] Foreign Application Priority Data

May 26, 1977 [DE] Fed. Rep. of Germany ....... 2723924

[51] Int. Cl.³ .............................................. B01D 35/00
[52] U.S. Cl. .................................................... 210/456
[58] Field of Search .............. 210/23 HF, 321 R, 433, 210/456, 498; 261/114 JP, 113; 55/418, 128

[56] References Cited

U.S. PATENT DOCUMENTS

| | | | |
|---|---|---|---|
| 2,516,102 | 7/1950 | Broant | 210/498 X |
| 2,584,206 | 2/1952 | Hodsdon | 210/498 |
| 2,665,009 | 1/1954 | Harstick | 210/456 |
| 2,868,696 | 1/1959 | Skinner | 261/114 JP |
| 3,265,855 | 8/1966 | Norton | 219/121 |
| 3,285,421 | 11/1966 | McKelvey, Jr. | 210/433 M |
| 3,303,254 | 2/1967 | Simms | 210/408 |
| 3,359,192 | 12/1967 | Heinrich | 1210/498 |
| 3,556,302 | 1/1971 | Agranat | 210/321 |
| 3,657,510 | 4/1972 | Rothroch | 219/121 A |

*Primary Examiner*—Theodore A. Granger
*Attorney, Agent, or Firm*—Burns, Doane, Swecker & Mathis

[57] ABSTRACT

A backpressure grid plate is provided for a pressure filtration system of the type comprising a housing with an inlet and outlet for conducting fluid to be treated, a filter disposed in the housing between said inlet and outlet, and a backpressure grid means arranged between the filter and the inlet. The backpressure grid means comprises a plate containing minute openings which are equal in size and distributed unevenly over the surface area of the plate in such manner that the surface distribution density of the openings is lowest within an inner impact area of the plate which receives inflowing fluid to be filtered and is highest within a proximity area of the plate located immediately adjacent to and surrounding the impact area. The surface distribution density of the openings within an outer area surrounding the proximity area is lower than that of the proximity area and higher than that of the impact area.

4 Claims, 2 Drawing Figures

BACKPRESSURE GRID PLATE FOR PRESSURE FILTRATION SYSTEM

BACKGROUND AND OBJECTS OF THE INVENTION

The invention concerns a backpressure grid for pressurized filtration systems.

The term "pressurized filtration" as used in connection with the invention includes filtration-like processes, for example, and especially, a reversed osmosis process.

Pressurized filtration systems of the type under discussion comprise usually pressure vessels in two or more parts which contain in an upper housing section at least one inlet for the fluid to be treated, and in a lower housing section at least one outlet for the permeation product. The two housing sections, connected pressure-proof with each other, are divided from each other by a usually horizontally arranged filter-supporting plate, with the filter, usually a membrane, resting upon it. As a rule, this filter consists of several layers, one upon the other.

In case of the standard pressurized filtration systems a grid or sieve, called a backpressure grid, is arranged closely above the surface of the filter. This backpressure grid has the task to prevent in the case of a reversal of the pressures acting upon the membrane, for example, from a damming-up and/or a pressure drop at the inflow side, a lifting, or at least an excessive lifting of the filter from its support which would lead to damage to the filter.

In the case of standard pressurized filtration systems this backpressure grid is designed in the form of a metal mesh screen, normally a stretched metal sieve, usually coated with a layer of PTFE (polytetrafluoroethylene). This layer will prevent the filter from adhering to the screen, thus protecting the filter or membrane respectively from damage, especially during autoclave operations. The coating serves also as corrosion inhibitor.

In order to prevent the inflowing stream, which is rather powerful in the case of pressurized filtration systems under discussion, from striking the filter directly and damaging the same, there is usually placed between the entrance of the inflow line into the pressure chamber of the pressurized filtration system and the backpressure grid a diffusing disk, called a baffle plate. The diameter of this, usually circular, baffle plate is designed as small as possible and at the same time as large as necessary to break, and distribute radially, the axially fed inflow thus protecting the membrane or the filter respectively.

In the case of the known pressurized filtration systems of this type the baffle plate is bolted or welded by way of web fittings or holding screws either to the upper housing section of the pressurized filtration system or directly to the backpressure grid.

The known pressurized filtration systems are disadvantageous because they do require the use of a baffle plate. Such baffle plate represents an additional component which must be installed by expenditure of additional labor. It is a structural member which is bulky due to its installation which requires establishment of minimum distances and is another component requiring maintenance and cleaning. Finally, the installation of the baffle plate in the pressure chamber of the pressure vessel requires the use of fastening points, that is weld joints, screw connections or riveted joints which are open to attack by corrosion.

Furthermore, tests conducted by the use of colored or otherwise marked fluids to be treated have shown that, surprisingly, baffle plates of all standard sizes will not distribute the inflow uniformly over the unobstructed surface of the filter. Filters of all diameters will display in all instances the "shadow" of the baffle plate, usually at the center of the circular filter, i.e. an area below the baffle plate which is practically not loaded at all by the fluid treated, especially in case of filtrations. This area on the filter is enclosed concentrically by an area which extends radially outward, its load far above average relative to the total active surface of the filter. Surprisingly, this overloaded radial central area is followed, especially in the case of filters with larger diameters, by a relatively wide peripheral area of the filter surface which is not utilized at all.

In view of this present state of the art it is the object of the invention to provide a backpressure grid which is designed in such manner that it will allow the construction and operation of a pressurized filtration system without the use of a baffle plate and will insure at the same time, even in the case of filters with large diameters, a homogenous distribution of the inflow over the entire working surface of the filter.

In order to solve this problem, the invention proposes that the backpressure grid be designed in the form of a perforated plate, all openings being very small and equal in size and distributed unevenly over the area of the perforated plate in such manner that the surface distribution density of the openings (number of openings per unit area) is substantially lower within the impact area of the inflow than within the immediately adjacent area of the perforated plate surrounding the impact area as a proximity area, and that the surface distribution density of the openings within the outer area, surrounding the proximity area, is again lower but still higher than within the impact area.

The backpressure grid proposed by the invention makes the use of a baffle plate unnecessary, even in the case of a very thinly constructed pressurized filtration system where the inflow aperture is located immediately above the surface of the backpressure grid. Since the backpressure grid has only a few openings of relatively small diameter within the impact area of the inflow the filter section located below the inflow aperture will be fully protected even at continuous operations. On the other hand, the arrangement of at least a few openings in the backpressure grid even within the area opposite to the inflow makes certain that even the areas of the working surface of the filter directly opposed to this area will become fully operative, not being located within the "shadow" of a baffle plate any longer.

The novel backpressure grid offers the additional substantial advantage that is possesses openings of very small diameter distributed over its entire area and that the entire unobstructed pass-through profile, made available by the openings, is very small relative to the total area of the backpressure grid plate, preferably in the range of 1 to 2% of the working surface of the backpressure grid. This will cause a certain damming-up at the backpressure grid by the fluid to be treated, resulting in a homogenous radial distribution of the feed fluid to be treated at the backpressure grid and thereby throughout the surface of the filter. The use of openings with identical diameters for the entire backpressure grid simplifies the manufacture of such unit. The specific uneven distribution of these openings over the working surface of the backpressure grid will compensate the rates of flow existing within the pressurized filtration system in such manner that the medium to be treated will arrive at the available filter surface in practically homogenous distribution. The higher surface distribution density of the openings within the proximity area which surrounds, and borders directly at the impact area will prevent the feed from radially skipping said area as a result of the deflection of the inflow striking the backpressure grid. Otherwise only an insufficient proportion of the medium to be treated would reach the surfaces of the filter which are located directly below this proximity area. The backpressure grid plate of the present invention reduces the surfaces distribution density in the peripheral outer areas where the back pressure of the feed flow, building up at the outer housing walls, has a greater influence.

Due to this compensation of the flow conditions within the pressure chamber of the pressurized filtration system, the backpressure grid proposed by the invention makes it thus feasible to omit the baffle plate which is indispensable in the case of known standard systems while insuring in addition thereto a practically complete homogenous distribution of the fluid to be treated throughout the working surface of the filter. In this manner there is guaranteed a full utilization and loading of the available filter surface area under any circumstances and especially for filters possessing large working diameters. This is particularly essential and important if membranes are used where a transverse flow component of the filtrate is practically not operative.

The backpressure grid of the invention is preferably made of high-grade steel and coated with an anti-adhesive protective layer, preferably consisting of polytetrafluoro ethylene. The openings are preferably produced by photo-etching, boring with a Laser beam or an electron beam in order to avoid any flash formation. These techniques are known per se and familiar to any person skilled in the art. Etching by use of photoresist masking was found to be an excellent method to produce the regular diameters of 0.5 to 1.5 mm and preferably 1.0 mm for the openings of the backpressure grid. In any case, however, the diameter of the openings is substantially greater than the diameter of the largest particles to be seperated from the feed liquid. Coating of the plate is effected in a step following the cutting of said bores or openings so that also the inner walls of said openings are entirely covered by said protective coating.

THE DRAWING

The advantages of the present invention will be explained in detail in connection with a preferred embodiment thereof depicted in the accompanying drawing in which.

DETAILED DESCRIPTION OF A PREFERRED EMBODIMENT OF THE INVENTION

Figure 1:
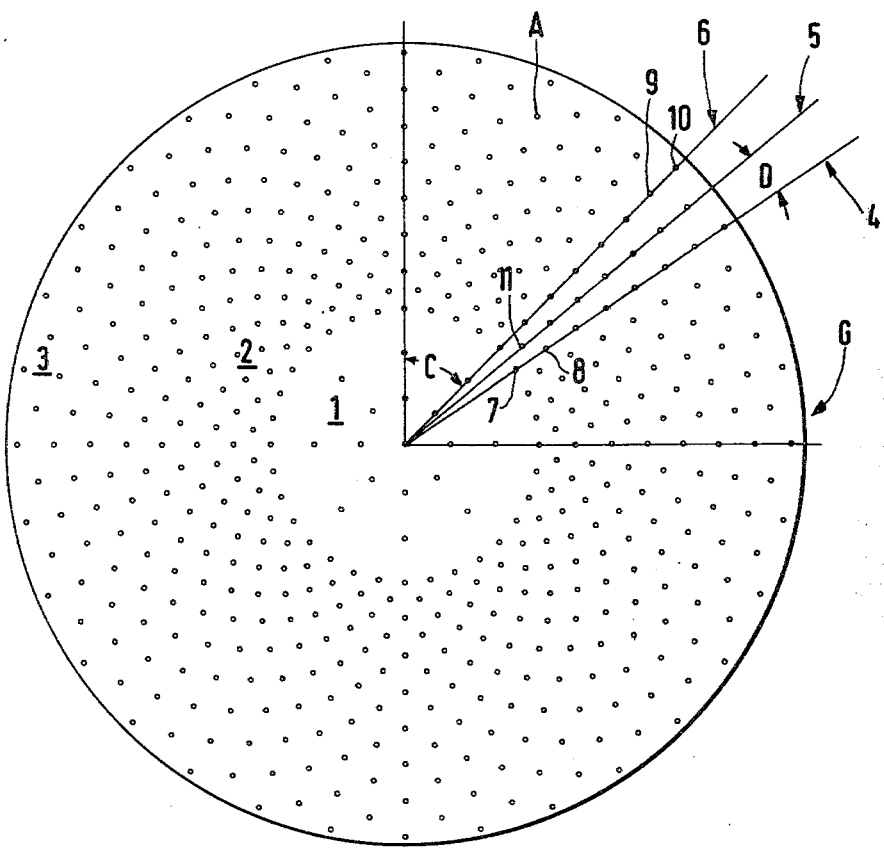
FIG. 1 shows a backpressure grid proposed by the invention in top view.

The backpressure grid G illustrated in FIG. 1 is a circular plate provided with minute openings A, each of these openings having a diameter of about 1.0 mm. The total free pass-through area made available by all openings amounts to approximately 1 to 2%, preferably 1.2%, of the total unobstructed area (i.e. working surface) of one side of the backpressure grid inside the pressurized filtration system.

The openings are distributed within three areas, namely, one central or inner area 1 where the inflow from the inlet strikes the backpressure grid plate ("impact area"), one area 2, directly surrounding and enclosing the former ("proximity area"), and an outer area 3 which surrounds the proximity area 2 and which extends up to the perimeter of the backpressure grid.

The openings are arranged within the perforated plate forming the backpressure grid in such manner that they are located on radii of equal angular distances from each other. For example, the radii 4, 5, 6, are spaced at equal angular distances from one another. The radial distances between adjacent openings on these radii in areas 2 and 3 are equal. For instance, points 7 and 8 of area 2 are spaced by the same distance as points 9 and 10 of area 3.

Within area 1, the radial distances between the openings are equal but are greater than the distances in areas 2 and 3 by about 10 to 40%, preferably by 20 to 30%. For example, openings 11 and 12 in area 1 are spaced by 20 to 30% more than the spacing between openings 7 and 8.

The angular distance C between adjacent radii in area 1 is 45°, whereas the angular distance D between adjacent radii in areas 2 and 3 is 5° 37′ 30″.

Therefore, there are formed, per quadrant, 17 radii which are occupied by openings (if the first and last radii are included in each count), three of which extend up to the center of the circle while the other 14 radii are provided with openings only up to the boundary between the proximity area 2 and the impact area 1.

By this arrangement of the equally sized openings at the unobstructed working surface of the backpressure grid there are formed, as illustrated by the FIG. 1, one relatively clearly defined impact area 1, one proximity area 2 surrounding the first-mentioned area with a substantially higher density of openings and one outer area 3, surrounding area 2 radially at the outside, the surface density of its openings being lower than the density within proximity area 3 but higher than the density within the impact area 1. The lower surface density of the openings within the outer area 3 relative to the proximity area 2, in spite of the equidistant arrangement of the openings at the radii, is caused by the progressively increasing peripheral distance between the radii within the outer area 3.

In the embodiment as shown in FIG. 1, there is no exactly defined line of demarcation between the proximity and outer areas. Rather the proximity area changes gradually and steadily into the outer area so that these two areas together form an area with a constant negative gradient of surface distribution density as the outer edge of the backpressure grid is approached. Thus, outside of the impact area there is a proximity area, and around the outside of the filter is an outer area whose surface distribution density of openings is less than that of the proximity area.

The surface distribution density of openings in the impact area is lower than that in the proximity area and outer areas, preferably being in the range of one-half to one-third the mean surface density of either of these areas (i.e., lower than by a factor of from 2 to 3).

A particularly advantageous distribution of the openings will be attained if (as shown in the figure), within the proximity area 2 and the outer area 3 the row of openings located at one radius is arranged in stagger to the row of openings located at the adjacent radius throughout the entire areas. That is, opening 11 of radius 5 is radially staggered relative to the openings 7 and 8 of an adjacent radius. The openings are thus arranged at equidistant concentric circules, with the distance between the circles being equal to one-half of the distance between the openings on the radii, where in each case the two openings following each other at the circumference of one of the circles are not located at radii immediately adjacent to each other but are separated by one radius. The term "surface density of the openings" as used above can be defined here as the number of openings per unit area (surface distribution density).

The backpressure grid of the invention is preferably made of high-grade steel and coated with an adhesion-rejecting protective layer, preferably with polytetrafluoro ethylene. The openings are preferably produced by photoetching, or by a Laser beam or an electron beam in order to avoid any flash formation. These techniques are known per se and familiar to any person skilled in the art. Etching by use of photoresist masking was found to be an excellent method to produce the regular diameters of 0.5 to 1.5 mm and preferably 1.0 mm for the openings of the filter.

Backpressure grids of the present invention make it possible to increase substantially the filtration rate, especially in the case of difficult filtration and large filter surfaces due to a more efficient and complete utilization of the filter surface available.

Figure 2:
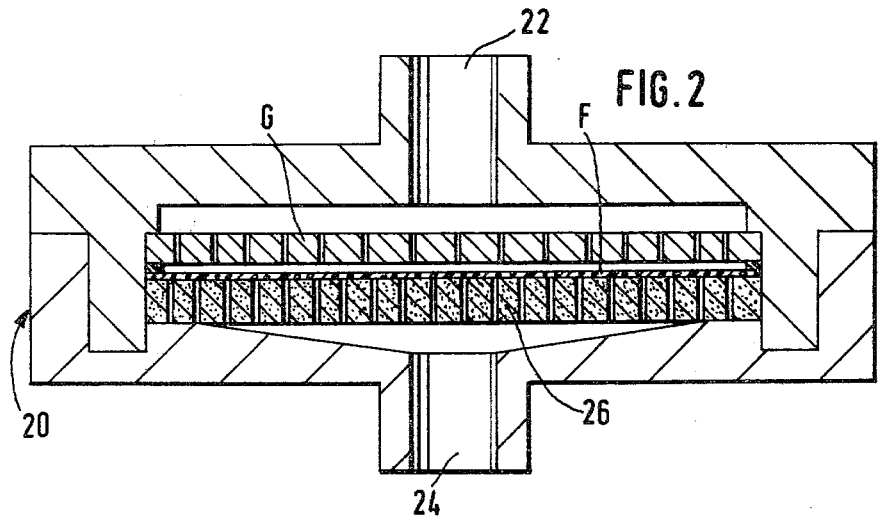
FIG. 2 is longitudinal sectional view schematically depicting a pressure filtration system utilizing the present invention.

The grid plate G is utilized in a pressure filtration system depicted schematically in FIG. 2 and comprising a housing 20 having a feed inlet 22 and a filtrate or permeate outlet 24. A filter support plate 26 supports one or more filters F which also can be formed as a laminate structure. A backpressure grid plate G according to the invention is positioned above the filter F.

The backpressure grid proposed by the invention makes the use of a baffle plate unnecessary, even in the case of a very flatly constructed pressurized filtration system of disk-like shape where the inflow aperture is located immediately above the surface of the backpressure grid plate. Since the backpressure grid plate has only a few openings of relatively small diameter within the impact area of the inflow, the filter section located below the inflow aperture will be fully protected even at continuous operations. On the other hand, the arrangement of at least a few openings within the impact area of the plate opposite the inflow makes certain that the areas of the working surface of the filter directly below and opposed to this impact area will become fully operative, i.e., no longer being located within the "shadow" of a baffle plate.

The novel backpressure grid plate offers the additional substantial advantage that it possesses openings of very small diameter distributed over its entire area and that the entire unobstructed pass-through profile, defined by the openings, is very small relative to the total area of the backpressure grid plate. This causes a certain damming-up of the fed fluid to be treated at the backpressure grid plate, resulting in a homogenous radial distribution of the feed fluid along the backpressure grid plate and thereby throughout the filter section therebelow. The use of openings with identical diameters for the entire backpressure grid plate simplifies the manufacture of such unit. The specific uneven distribution of these openings over the working surface of the backpressure filter plate compensates for the different rates of radial flow existing within the pressurized filtration system in such manner that the medium to be treated will arrive from the grid plate at the available filter surface in practically homogenous distribution. The higher surface distribution density of the openings within the proximity area which surrounds, and borders the impact area, prevents the feed flow from radially skipping said area as a result of the deflection of the inflow striking the backpressure filter plate within the impact area, since otherwise only an insufficient proportion of the medium to be treated would reach the surfaces of the filter section which are located directly below this proximity area. The backpressure grid plate of the present invention reduces the surface density in the peripheral outer areas where the backpressure of the feed flow, building up at the outer housing walls, has a greater influence.

Due to this compensation of the flow conditions within the pressure chamber of the pressurized filtration system the backpressure grid proposed by the invention makes it thus feasible to omit the baffle plate which is indispensable in the case of known standard systems. Also insured in addition thereto is practically complete homogenous distribution of the fluid to be treated throughout the working surface of the filter section. In this manner there is guaranteed a full utilization and loading of the available filter section area under any circumstances and especially for filters possessing large working diameters. This is particularly essential and important if membranes are used in which a transverse flow component of the feed and filtrate respectively is practically not operative.

Although the invention has been described in connection with a preferred embodiment thereof, it will be appreciated by those skilled in the art that additions, modifications, substitutions and deletions not specifically described may be made without departing from the spirit and scope of the invention as defined in the appended claims. Especially the boundary between the proximity area and the outer area can be, of course, also formed as a demarcation line seperating two clearly destructive areas.

What is claimed is:

1. In a pressure filtration system of the type comprising a housing with an inlet and outlet for conducting a pressurized fluid to be treated, a filter disposed in said housing between said inlet and outlet, and a backpressure grid means arranged between said filter and said inlet, the improvement wherein said backpressure grid means comprises a plate containing minute openings which conduct fluid onto said filter, said openings being equal in size and distributed unevenly over the surface area of the plate in such manner that the surface distribution density of a plurality of the openings within an inner impact area of the plate which receives inflowing fluid to be filtered is substantially lower than the surface distribution density of a plurality of the openings within a proximity area of the plate located immediately adjacent to and surrounding the impact area; the surface distribution density of a plurality of the openings within an outer area surrounding said proximity area is lower than that of said proximity area and higher than that of said impact area.

2. Apparatus as defined in claim 1, wherein said backpressure grid comprises high-grade steel, and wherein the openings are circular and have a diameter of approximately 0.5 to 1.5 mm, said grid being entirely coated with an anti-adhesive coating.

3. Apparatus as defined in claim 1, wherein the total area of all openings amounts to approximately 1 to 2% of the surface of one side of the backpressure grid that is exposed.

4. Apparatus as defined in claim 1, wherein the surface distribution density of the openings within said impact area is lower, approximately by a factor 2 to 3, than the mean surface distribution density of the openings within the proximity area and the outer area, and wherein the proximity area 2 changes gradually and steadily into the outer area so that these two areas together form an area with a constant negative gradient of surface distribution density.

* * * * *